Patented Apr. 28, 1942

2,281,347

UNITED STATES PATENT OFFICE 2,281,347

SWEETENING HYDROCARBON OILS

Charles M. Blair, Jr., Webster Groves, Mo., assignor to Petrolite Corporation, Ltd., Wilmington, Del., a corporation of Delaware No Drawing. Application March 15, 1941,
Serial No. 383,637

13 Claims. (Cl. 196—30)

This invention relates to the sweetening of hydrocarbon oils and, more particularly, to certain improvements in the so-called "Solutizer" process for sweetening petroleum distillates by actual extraction of mercaptans therefrom.

Most petroleum distillates, such as gasoline, naphtha, kerosene, and benzene, as originally produced, contain mercaptans. To remove the objectionable odor of these distillates and to improve other properties thereof, it is desirable to convert the mercaptans to innocuous compounds or to remove them. The so-called "doctor" treatment has in the past been most commonly applied to these oils. This treatment converts the mercaptans to disulfides and other sulfur-containing compounds which have less odor and which are believed to have less deleterious effect on certain properties of the distillates. Lately, however, it has been found possible to extract mercaptans from hydrocarbon oils by means of strongly alkaline aqueous solutions containing certain organic compounds which greatly increase the distribution ratio of mercaptans between the alkaline liquid phase and the hydrocarbon oil. This process, which is commonly known as the "Solutizer" process, is fully described in various U. S. patents and in the literature, notably in Yabroff et al., Patents #2,149,379, March 7, 1939; #2,149,380, March 7, 1939; and #2,164,851, July 4, 1939; and the article by L. E. Border in Chemical and Metallurgical Engineering, vol. 47, page 776 et seq. (1940).

Since the solutizer process removes the mercaptans originally present in the oils, rather than converting them to other sulfur-containing organic compounds, it yields treated distillates of very low sulfur content. Such low sulfur content oils have certain very desirable properties. In particular, those used for motor fuel have a higher octane number, show a greater response to the addition of anti-knock compounds, such as tetraethyl lead, and show a smaller requirement of inhibitor for the prevention of gum formation.

The principal object of the present invention is to render the solutizer process more economical and rapid and more generally applicable by the use of certain chemical reagents to prevent the emulsification of the hydrocarbon oil with the extracting solution.

In actual practice the solutizer extracting solution (hereinafter called "solutizer solution" or simply "solutizer") is intimately mixed with several volumes of the hydrocarbon oil to be sweetened. For rapid and efficient removal of mercaptans, it is necessary that during mixing the total interfacial area between the two phases—solutizer solution and hydrocarbon oil—be large; and such intimate contact is obtained in various ways, such as by vigorous stirring, flow through orifices or baffled pipe, flow through packed towers, etc. The most commonly employed mixing practice is to flow the two liquid phases countercurrently in a packed tower. The heavier solutizer solution is introduced near the top of the tower and flows down through the tower, where it is dispersed in contact with the upward flowing distillate. Used solutizer solution, containing mercaptans, then collects in the bottom of the tower, where it is drawn off and regenerated for subsequent re-use, while treated gasoline or other hydrocarbon product leaves through the top of the tower.

It has been found, however, that in actual practice, many oils do not separate completely from the solutizer solution, and the liquid leaving the top of the tower or other mixing vessel is not a clear treated distillate, but in fact is an emulsion containing appreciable amounts of solutizer solution. In order to effect a more complete separation, then, the effluent from the mixing zone must be settled quietly for a period of time. But even after long periods of settling, some distillates do not separate completely from the emulsified solutizer solution; and as a result, appreciable amounts of this relatively costly reagent are lost, and extra expense is entailed in washing it out or otherwise removing it from the distillate.

The cause of this emulsion formation observed with certain distillates is not completely understood; but it is believed to result from the accumulation in the solutizer solution of salts of various acidic materials, extracted from the distillate, which function as emulsifying agents, thus preventing complete coalescence and subsidence of dispersed droplets. The emulsion appears to be of the solutizer-in-oil type, somewhat analogous to the water-in-oil type of emulsion.

I have found that this emulsification tendency can be counteracted, with resulting great improvement in separation and sedimentation of solutizer solution, by the introduction into the solutizer solution or the distillate to be treated of a small amount of certain complex, high molecular weight, oil-soluble sulfonates of the kind to be described.

The use of these organic compounds in preventing the emulsification of solutizer solution constitutes the principal object of this invention. The compounds in question belong to the general class of high molecular weight organic sulfonic acids and their salts, and are particularly characterized by the fact that their alkali metal salts are soluble or colloidally dispersible in hydrocarbon oils, such as benzol, xylene, kerosene, mineral oil, and the like, but may be insoluble or only slightly soluble in water. In these respects, they differ from the large number of well known water-soluble organic sulfonates employed as wetting agents, detergents, and surface tension depressants, which in general are insoluble or only very slightly soluble in hydrocarbons. The sulfonates employed in the present process contain hydrocarbon radicals or residues and have molecular weights in the range between about 250 and 800 with the preferred reagents having molecular weights in the range between 300 and 600.

More specifically, the present invention includes the use, as demulsifiers or emulsion preventers in the solutizer process, of the oil-soluble sulfonates of certain petroleum sulfonic acids, long chain fatty sulfonic acids, highly alkylated, cycloalkylated or aralkylated aromatic sulfonic acids, partially or completely hydrogenated, alkylated, cycloalkylated or aralkylated aromatic sulfonic acids, alkylated, cycloalkylated or aralkylated diaryl ether sulfonic acids, and high molecular weight sulfonated sulfones.

Generally, the sodium, potassium, or ammonium salts are preferred because of their cheapness, but the sulfonic acids themselves may be added to the distillate or solutizer solution, if desired, since such acids will immediately be converted to their alkali metal salts on contact with the strongly alkaline solutizer solution. At present the most commonly used solutizer solution is between 4N and 6N in KOH. The potassium salts of the sulfonic acids in general are more oil soluble than the sodium and ammonium salts, so for this reason are to be preferred for certain modes of use, e. g., when the reagent is added to the distillate stream. Reference herein and in the claims to the use of sulfonates will be understood to include the use of sulfonates formed in situ by reaction between the strongly alkaline solutizer solution and added sulfonic acids corresponding to the sulfonates subsequently described.

One class of reagents having utility in the present process, as mentioned above, comprises the highly alkylated and cycloalkylated aromatic sulfonates. Examples of such compounds are sodium tri- or tetraamyl naphthalene sulfonate, sodium tributyl naphthalene sulfonate, potassium dodecyl diphenyl sulfonate, potassium dicyclohexyl naphthalene sulfonate, sodium dioctyl retene sulfonate and sodium tridecyl perylene sulfonate. Those compounds, whose aromatic residues contain two or more rings and whose alkyl substituents contain 10 or more carbon atoms, seem to be of particular value. The naphthalene derivatives have the added advantage of being relatively low in cost. The hydrogenated or partially hydrogenated analogues of this class of compounds are also useful in the present process. Examples of such reagents are sodium tri-isobutyl dihydronaphthalene sulfonate and potassium diamyl tetrahydronaphthalene sulfonate.

Certain sulfonic acids derived from petroleum constitute an important group of acids whose oil-soluble salts are contemplated for use as emulsion preventers or demulsifiers in the present process. One variety of petroleum sulfonic acid is the kind frequently referred to as mahogany acid. Petroleum sulfonic acids are produced from a wide variety of petroleum distillates, petroleum fractions, and in some cases, from crude petroleum itself. The sulfonic acids obtained are roughly classified into two groups, namely, green acids and mahogany acids. The former are characterized by the fact that their alkali metal salts are very water-soluble and only slightly soluble in oil. Such green acids and their salts are, therefore, not contemplated for use in the present process. The so-called mahogany sulfonates, on the other hand, form salts which are quite soluble or colloidally dispersible in oil, as well as in some other organic solvents, such as alcohol, and are well suited for use in the present process. Such mahogany acids are obtained by a number of different methods. Treatment of certain crude petroleum oils with strong sulfuric acid produces mixtures of green acids and mahogany acids which may be separated by suitable methods to give mahogany acids in a sufficiently pure form for use in the present process. Likewise, in the production of white mineral oil and in the refining of certain lubricating oils, it is customary to treat these fractions with strong sulfuric acid, with the resulting formation of substantial amounts of mahogany acids which are subsequently separated from the reaction mass or from the raffinate in which they are dissolved.

Another class of compounds having utility in the present process includes the substituted diaryl oxide sulfonic acids and their salts as exemplified by trioctyl diphenyl oxide sulfonic acid and the like. Other examples from this class are dicyclohexyl diphenyl oxide sulfonic acid, tetrapropyl phenyl alphanaphthyl oxide sulfonic acid and triamyl p-phenoxy diphenyl oxide sulfonic acid. For the preparation of members of this class, attention is directed to U. S. Patent #2,081,876, May 25, 1937, to Prahl.

Still another class of reagents contemplated for use in the present invention comprises the sulfone sulfonic acids and their salts. Examples of this class are dodecyl phenyl sulfone sodium sulfonate, naphthyl benzyl sulfone potassium sulfonate and octadecyl toluene sulfone sodium sulfonate. Preparation of many members of this class is described in U. S. Patent #2,010,754, August 6, 1935, to Felix, et al.

Although, as has been pointed out, these sulfonates are soluble in hydrocarbon oils and usually only slightly soluble in water, they may be quite appreciably soluble in the solutizer solution; and in actual practice my preferred method of adding the demulsifier to the system is in the form of a solution in the solutizer solution being used for extraction of mercaptans from the sour distillate. On mixing the solutizer solution and distillate, some demulsifier apparently is extracted by the hydrocarbon phase, but the major proportion remains in the solutizer as evidenced by the fact that it may be regenerated and reused for some time before it begins to exhibit the property of becoming emulsified with the sweetened oil. From time to time more demulsifier is added to the solutizer to maintain its non-emulsifying property.

The amount of organic sulfonate required to accomplish the object of the present invention depends upon the particular sulfonate used, the particular distillate being sweetened, the composition of the solutizer solution, the character of the mixing of phases, and perhaps other variables. For this reason it is desirable to make preliminary laboratory tests with the solutizer and distillate being treated to determine the most efficient demulsifier and the approximate concentration in which it should be used.

The following description of a typical application of the present process to the usual continuous solutizer plant will serve to indicate the preferred procedure used and the kind of results to be obtained:

In the extraction of a certain cracked gasoline stock in a continuous counter-current packed tower system, it was found that the gasoline leaving the settler contained 0.2% of solutizer in emulsified form. Laboratory tests showed that this emulsion could best be eliminated by use of mahogany sulfonate in the solutizer. It was further found that when one volume of solutizer containing 0.2% of this sulfonate was mixed with five volumes of gasoline—the volume ratio obtaining in the plant—the emulsion carryover was completely eliminated, but that the use of only half this amount of sulfonate did not completely prevent carryover. The subsequent addition of 0.02% of sulfonate to the solutizer solution originally containing 0.2% of sulfonate, after each use and regeneration, was found to be sufficient to maintain the solution in a non-emulsifying condition. On the basis of these tests, mahogany sulfonate was then added to the plant solutizer solution in the proportion of 8 gallons per 100 bbls. of solutizer, and extraction was started. Further amounts of mahogany sulfonate in the ratio of one gallon per 100 bbls. were introduced into the regenerated solutizer line from the reboiler by means of a small chemical proportioning pump. After operation for some time without emulsion carryover trouble, the ratio of sulfonate injection into the regenerated solutizer solution was decreased gradually to 0.6 gallon per 100 barrels, the minimum which would give continuous trouble-free operation.

In the above example, the volume ratio of gasoline treated to sulfonate used is about 30,000 to one. Depending upon the particular distillate and solutizer being used and upon plant conditions, the ratio to be expected in a particular case may be greater or smaller than this value. In general, it will usually exceed 5000, and in some instances may be as large as 50,000 or 60,000 or even greater. Naturally, where a very clean distillate is desired and where the available settling time following mixing is short, the amount of demulsifier required will be greater than where the reverse conditions obtain.

In some operations of the sweetening plant, it may be found more convenient to add the demulsifier required to maintain the solutizer solution in a non-emulsifying state in batches rather than continuously, as described above. Usually, after the initial addition of sulfonate to the solutizer, it may be used through several regenerations or cycles before emulsification becomes serious. When this point is reached, the entire makeup of demulsifier may be added as one batch. This procedure, while less elegant than the continuous method previously described, usually gives quite satisfactory results.

In still other instances, it may be more convenient to add all or part of the emulsion preventing reagent directly to the hydrocarbon oil, rather than to the solutizer. Where a sulfonate has been added to the solutizer, it is sometimes convenient to add the small amount of makeup sulfonate directly to the distillate stream; and, if desired, all of the sulfonate may be added in this form, none of it being added to the solutizer originally.

In the use of the emulsion preventing reagents described herein, the only requirement is that they be present in the system immediately after the mixing of the two phases or during the settling operation, and preferably during the mixing of the two phases.

It will be understood that the use of the reagents of this invention is not limited to the exact procedures described. Certain obvious variations will be seen and appreciated by those skilled in the art, and in some cases procedures other than those recited will be necessary, as for example, in plants employing a batch—rather than continuous—process of sweetening distillates.

It will be further understood that instead of employing a single emulsifier of the kind herein described, one may use a mixture of two or more, if desired. Indeed, the process of manufacture may result in the production of a mixture of demulsifying reagents rather than a single pure substance.

It should be pointed out that in addition to the sulfonates herein described for use in the present process, there are other high molecular weight oil-soluble organic sulfonates which have some utility in preventing emulsification and in promoting subsidence of solutizer solution, but which, because of their structure, may not always be sufficiently stable in the presence of solutizer solution to make their employment cheap enough and simple enough for general use. However, where emulsification trouble is not encountered continuously and recurrently, their use may prove effective and sufficiently economical. Examples of such sulfonates are those in which a high molecular weight hydrocarbon residue is joined through an ester link to the residue containing the sulfonate group. Specific examples of such reagents are didecyl sodium sulfosuccinate and other analogous diesters of sodium sulfosuccinic acid. On contact with the highly alkaline solutizer solution, and especially during its regeneration which involves a steam distillation to remove mercaptans, such compounds containing ester linkages are more or less rapidly hydrolyzed with resulting loss of activity. Other examples of such oil-soluble, hydrolyzable sulfonates include the didecyl carbinol ester of sodium sulfo acetic acid, and other higher alkyl primary, secondary or tertiary alcohol esters of sodium sulfo acetic acid; sodium sulfo-ethyl stearyl amide; and potassium sulfo propyl oleate.

Having described my invention, I claim:

1. In the sweetening of sour hydrocarbon oils by treatment thereof with aqueous alkaline solution capable of removing mercaptans from the oil, the method of preventing emulsification of alkaline solution and oil which comprises effecting said treatment in the presence of a relatively small amount of an oil-soluble sulfonate having a molecular weight between 250 and 800.

2. The method as defined in claim 1 further characterized in that said sulfonate is incorporated into the alkaline solution prior to the treatment of the oil with the solution.

3. The method as defined in claim 1 further characterized in that said sulfonate is incorporated into the oil to be treated with the alkaline solution.

4. In the sweetening of sour hydrocarbon oils by treatment thereof with aqueous alkaline solution capable of removing mercaptans from the oil, the method of preventing emulsification of alkaline solution and oil which comprises effecting said treatment in the presence of a relatively small amount of an oil-soluble sulfonate having a molecular weight between 300 and 600.

5. In the sweetening of sour hydrocarbon oils by treatment thereof with aqueous alkaline solution capable of removing mercaptans from the oil, the method of preventing emulsification of alkaline solution and oil which comprises effecting said treatment in the presence of a relatively small amount of a hydrolysis-resistant, oil-soluble sulfonate having a molecular weight between 300 and 600.

6. In the sweetening of sour hydrocarbon oils by treatment thereof with aqueous alkaline solution capable of removing mercaptans from the oil, the method of preventing emulsification of alkaline solution and oil which comprises effecting said treatment in the presence of a relatively small amount of a mahogany sulfonate.

7. In the sweetening of sour hydrocarbon oils by treatment thereof with aqueous alkaline solution capable of removing mercaptans from the oil, the method of preventing emulsification of alkaline solution and oil which comprises effecting said treatment in the presence of a relatively small amount of an oil-soluble, alkylated aromatic sulfonate having a molecular weight between 300 and 600.

8. In the sweetening of sour hydrocarbon oils by treatment thereof with aqueous alkaline solution capable of removing mercaptans from the oil, the method of preventing emulsification of alkaline solution and oil which comprises effecting said treatment in the presence of a relatively small amount of an oil-soluble sulfonated sulfone having a molecular weight between 300 and 600.

9. A process for sweetening sour hydrocarbon oils which comprises mixing the oil with an aqueous alkaline mercaptan-extracting solution in the presence of a relatively small amount of an oil-soluble sulfonate having a molecular weight between 300 and 600, whereby to prevent emulsification of alkaline solution in oil, and separating the resultant mixture into a hydrocarbon phase and an aqueous phase.

10. The process as defined in claim 9 further characterized in that said sulfonate is substantially hydrolysis-resistant.

11. The process as defined in claim 9 further characterized in that said sulfonate is a salt of a mahogany acid.

12. The process as defined in claim 9 further characterized in that said sulfonate is an alkylated naphthalene sulfonate.

13. The process as defined in claim 9 further characterized in that said sulfonate is a salt of a sulfone sulfonic acid.

CHARLES M. BLAIR, Jr.